United States Patent Office
3,555,028
Patented Jan. 12, 1971

3,555,028
DERIVATIVES OF 11-PIPERAZINYL- AND 11-HEXAHYDRODIAZEPINYL - 10,11 - DIHYDRODIBENZO [b,f]THIEPIN-10-OL
Walter Schindler, Riehen, and Erich Schmid, Basel, Switzerland, assignors to Geigy Chemical Corporation, Ardsley, N.Y., a corporation of New York
No Drawing. Filed Feb. 5, 1968, Ser. No. 702,828
Claims priority, application Switzerland, Feb. 10, 1967, 2,020/67
Int. Cl. C07d 67/00
U.S. Cl. 260—268
14 Claims

ABSTRACT OF THE DISCLOSURE

The compounds are of the class of thiepin derivatives, more particularly thiepin derivatives, which may be substituted in the benzene rings by alkyl, alkoxy or alkylthio, further substituted in 11 positions by piperazinyl which may be fully substituted, and in 10-position by hydroxy or o-alkanoyl, and acid addition salts thereof. The compounds are useful as anti-emetic, anaesthesia-potentiating, reflex-inhibiting and catatonia inducing agents. An illustrative embodiment is 11-(4-methyl-1-piperazinyl)-10,11-dihydrodibenzo[b,f]thiepin-10-ol.

DETAILED DISCLOSURE

The present invention concerns new thiepin derivatives, processes for the production thereof, pharmaceutical preparations, which contain the new compounds and their use in warm-blooded animals. More particularly the present invention relates to compounds of the general Formula I

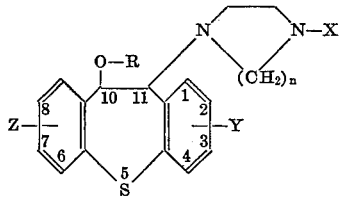

(I)

wherein:
$n$ is an integer of 2 or 3,
R is hydrogen or lower alkanoyl with up to 7 carbon atoms,
X is hydrogen, lower alkyl, hydroxyalkyl or benzyl,
Y and
Z are hydrogen, halogen preferably fluorine, chlorine and bromine, lower alkyl, lower alkoxy or lower alkylthio, as well as their addition salts with inorganic or organic acids.

Particularly valuable compounds according to the invention are those wherein R is hydrogen or lower alkanoyl with up to 7 carbon atoms; $n$ is an integer of 2 or 3; X is methyl, 2-hydroxyethyl, or benzyl; and Y and Z each independently are hydrogen, chlorine, lower alkoxy or lower alkylthio, and pharmaceutically acceptable acid addition salts thereof.

Furthermore, the present invention relates to novel methods and compositions containing a compound of the above-mentioned formula for effecting anti-emetic, anaesthesia-potentiating, reflex-inhibiting and catatonic activities in warm-blooded animals, especially mammals. More particularly, the method of effecting such pharmacological activities in mammals is concerned with administering a compound as defined in the above-described formula in therapeutic doses.

According to this invention the scope of the substituents as defined in the above-mentioned formula may be characterised as follows:

The term "lower alkyl" as used herein alone or in "lower alkoxy," "lower alkylthio" and "lower alkanoyl" means straight or branched alkyl chains of the general formula $C_mH_{2m+1}$ wherein $m$ represents an integer of 7 or less. More particularly in the compounds of general Formula I, R, as alkanoyl group having at most 7 carbon atoms, can be, e.g. the formyl, acetyl, propionyl, 2-methyl-propionyl, butyryl, 2-methyl-butyryl 3-methyl-butyryl, valeryl, 2-methyl-valeryl, 3-methyl-valeryl, hexanoyl, 2-methyl-hexanoyl, 3-methyl-hexanoyl, pivaloyl or the heptanoyl group.

X, as low alkyl group, can be, e.g. the methyl, ethyl, propyl, isopropyl, butyl, isobutyl or the sec. butyl group, and as hydroxyalkyl group it can be, e.g. the 2-hydroxyethyl, 3-hydroxypropyl or the 2-methyl-3-hydroxy-propyl group.

Y and Z can be either identical or different, and, as substituents of the benzene rings, can be in the 1-, 2-, 3- or 4- and 6-, 7-, 8- or 9-position, the 2- and 8-positions being preferred. As low alkyl groups they represent, e.g. the methyl, ethyl, propyl, isopropyl, butyl or the isobutyl group; as low alkoxy group they represent e.g. the methoxy, ethoxy, propoxy, isopropoxy, butoxy or the isobutoxy group; and as low alkylthio groups they represent, e.g. the methylthio, ethylthio, propylthio, butylthio or the isobutylthio group.

To produce the new compounds of general Formula I, the carbonyl groups in a compound of general Formula II

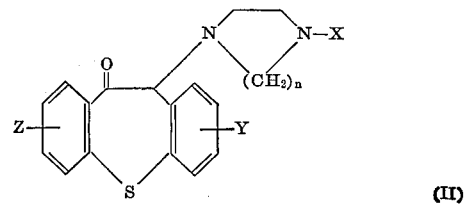

(II)

wherein $n$, X, Y and Z have the meanings given in Formula I, is reduced to the hydroxy group, if desired, a compound obtained of general Formula I the radical —OR of which is a hydroxy group, is acylated to form one the radical —OR of which represents an alkanoyloxy group having at most 7 carbon atoms, and if desired, a compound obtained of the general Formula I is converted into an addition salt with an inorganic or organic acid.

The reduction of the carbonyl compounds to the corresponding hydroxy compounds which can be in the cis or trans form, may be performed with the aid of complex metal hydride, in particular with lithium aluminium hydride. Also, for example, sodium borohydride, potassium borohydride or lithium borohydride can be used as well as complex metal hydride.

It is advantageous to use the complex metal hydrides in a solvent. Suitable solvents are, e.g. for lithium aluminium hydride; ether-type liquids such as ether, tetrahydrofuran, dioxane, dibutyl ether, di-isopropyl ether, butyl-ethyl ether or diethylene glycol diethyl ether; for lithium borohydride: ether-type liquids such as ether and tetrahydrofuran; for sodium and potassium borohydride: alkanols such as methanol or ethanol, optionally with the addition of an ether-type liquid and/or of water, e.g. methanol/water, methanol/ether or methanol/dioxane/water.

In addition, other boron compounds such as diborane or diisoamyl borane can be used for the reduction according to the invention. These reducing agents are preferably used dissolved in an ether-type liquid. Tetrahydrofuran, in which diborane dissolves easily, is particularly suitable.

Moreover, a compound of general Formula II may be reduced with a metal alcoholate in the corresponding alkanol or also in a hydrocarbon such as toluene or xylene. This reduction is optionally performed under an atmosphere of nitrogen. Aluminium isopropylate is a particularly suitable reducing agent. A reaction temperature of about 20–145° is maintained during the reaction.

The hydroxy group of compounds of general Formula I wherein the radical —OR is a hydroxy group can be acylated, for example, by heating them in the anhydride of a low alkanoic acid such as acetic acid, propionic acid, butyric acid, pivalic acid or enanthic acid. In addition, the corresponding carboxylic acid halides such as chlorides or bromides can be used for this acylation instead of the anhydrides; these are used advantageously in the presence of an acid binding agent. Suitable acid binding agents are, e.g. tertiary bases such as triethylamine. Instead of the hydroxy compounds of general Formula I, also alkali metal derivatives, e.g. sodium derivatives, of such compounds can be reacted with corresponding acid halides.

The starting compounds of general Formula II are described in the literature.

The compounds of general Formula I obtained according to the process of the present invention are then converted, if desired, into their addition salts with inorganic and organic acids in the usual way. For example, the acid desired as salt component or a solution thereof is added to a solution of a compound of general Formula I in an organic solvent. Preferably organic solvents in which the salt formed is difficultly soluble are chosen for the reaction so that it can be isolated by filtration. Such solvents are, e.g. methanol, acetone, methylethylketone, methanol/ether or ethanol/ether.

Instead of free bases, pharmaceutically acceptable acid addition salts can be used, i.e. salts with those acids the anions of which are non-toxic in the usual dosages. It is also of advantage when the salts to be used as compositions crystallise well and are not or are only slightly hygroscopic. Hydrochloric acid, hydrobromic acid, sulfuric acid, phosphoric acid, methane sulfonic acid, ethane sulfonic acid, β-hydroxyethane sulfonic acid, acetic acid, malic acid, tartaric acid, citric acid, lactic acid, oxalic acid, succinic acid, fumaric acid, maleic acid, benzoic acid, salicylic acid, phenyl acetic acid or mandelic acid, for example, can be used for salt formation with compounds of the general Formula I.

As pointed out above, the compounds of the present invention, i.e. compounds of the above-described general formula and their physiologically tolerable acid addition salts possess valuable pharmacological and therapeutic properties and may be used in the form of pharmaceutical compositions, especially as anti-emtic, anaesthesia-potentiating, reflex-inhibiting and catatonia inducing agents. According to the pharmacological tests, the compounds of the present invention may be used for the treatment of insomnia, agitation, anxiety, and mental disorders like psychoneurosis, schizophrenia and manic conditions. The antiemetic properties of some of the instantly claimed compounds offer utility in motion sickness, post-operative vomiting, gastro-intestinal disorders, i.e. in all kinds of nausea.

The toxicity of the compounds of the instant invention is low: for instance, the $LD_{50}$ of 2-chloro-11-[4-(2-hydroxyethyl) - 1 - piperazinyl]-10,11-dihydro dibenzo[b,f]thiepin-10-ol administered orally to mice is higher than 800 mg./kg.; the $LD_{50}$ of 8-chloro-11-(4-methyl-1-piperazinyl)-10,11-dihydro dibenzo[b,f]thiepin-10-ol in mice is higher than 200 mg./kg. i.p.; the $LD_{50}$ of 2-chloro-11-(4-methyl-1-piperazinyl) - 10,11 - dihydro dibenzo[b,f]thiepin-10-ol methane sulfonate is higher than 80 mg./kg. on intravenous administration to mice.

The compounds possess a general quietening effect on animals that can be seen in the motility test and in the potentiation of a short-acting anaesthetic; this effect is further substantiated by the adrenolytic effect on the isolated seminal vesicle. The latter test being correlated with a decrease in activity in the intact animal. The tests were performed as described in greater detail in the following paragraphs.

According to the test described by C. Morpurgo et al.: Psychopharmacologia 6. 178–191 (1964), the dosage of which a decrease of 50% of motility over the control group is determined (expressed as $DE_{50}$) on administration of the following compounds:

| Compound administered | $DE_{50}$ mg./kg. i.p., about— | Test animals |
|---|---|---|
| 2-chloro-11-(4-methyl-1-piperazinyl)-10,11-dihydro dibenzo[b,f]thiepin-10-ol. | 1.3 | Mice. |
| 2-chloro-11-(4-methyl-1-piperazinyl)-10,11-dihydro dibenzo[b,f]thiepin-10-ol methane sulfonate. | 1.4 | Do. |
| 8 chloro-11-(4-methyl-1-piperazinyl)-10,11-dihydro dibenzo[b,f]thiepin-10-ol. | 1.5 | Do. |

According to a method described by W. Theobald et al.: Arch-int. Pharmacodyn.: 148, 560–596 (1964) and W. Theobald et al.: Arzneimittelforschung 9, 285–286 (1959) the extent to which anaesthesia induced by a standard amount of the anaesthetic, 4-alkyl-2-methoxy phenoxyacetic acid diethyl amide, is prolonged by a known dose of test compound. The change in the duration of the anaesthetic effect was calculated in percent of the effect observed with the control group; the results are given below:

| Compound administered | Dosage, mg./kg. s.c. | Test animal | Percent increase in sleeping time |
|---|---|---|---|
| 2-chloro-11-(4-methyl-1-piperazinyl)-10,11-dihydro dibenzo[b,f]thiepin-10-ol. | 20 | Mice | +1,150 |
| 2 chloro-11-(4-methyl-1-piperazinyl)-10,11-dihydro dibenzo[b,f]thiepin-10-ol methane sulfonate. | 20 | do | +1,600 |

The adrenolytic activity of the compounds of the present invention was determined according to a method described by J. Brügger: Helv. Physiol. Acta 3, 117–134 (1945) und F. Gross et al. Schweiz. med. Wschr. 81, 352–357 (1951). In this test is determined the amount of a compound necessary to present by 50 to 80% the extent of contraction of the seminal vesicle of the mature male guinea pigs induced by a standard amount of adrenaline bitartrate. The amount of test compound necessary having the same contraction-inhibiting effect as 1γ regitin is given in the following table (1γ regitin equals 1).

| Compound administered | Test animal | Adrenolytic value, about— |
|---|---|---|
| 2-chloro-11-(4-methyl-1-piperazinyl)-10,11-dihydro dibenzo[b,f]-thiepin-10-ol. | Guinea pig | 0.45 |
| 2-chloro-11-(4-methyl-1-piperazinyl)-10,11-dihydro dibenzo[b,f]-thiepin-10-ol methanesulfonate. | do | 0.30 |

The antiemetic activity of the compounds of the present invention was determined in the golden hamster. 30 minutes after the injection of apomorphine (2 mg./kg. s.c.), the induced licking reaction is judged. Three days later, the test is repeated on the same animals after administering the test compounds. The dose of compound which inhibits the licking reaction in 50% of the animals is determined. ($DE_{50}$ mg./kg.).

| Compound administered: | DE$_{50}$ mg./kg. |
|---|---|
| 2-chloro-11 - (4 - methyl-1-piperazinyl) - 10,11 - dihydro dibenzo[b,f]-thiepin-10-ol. | About 3.5 |
| 2-chloro - 11 - (4-methyl-1-piperazinyl) - 10,11 - dihydro dibenzo[b,f]-thiepin-10-ol methane sulfonate. | About 2.5 |

The compounds of the present invention may be used in warm-blooded animals, particularly mammals, in form of pharmaceutical compositions containing the compounds in admixture or conjunction with a pharmaceutical organic or inorganic solid or liquid carrier for oral, rectal or parenteral administration. The total daily doses for mammals vary from about 0.1 mg./kg. to about 200 mg./kg., preferably about 0.15 mg./kg. to about 150 mg./kg. depending on the mammal and condition. The preferred route of administration is the oral route. Suitable compositions include, without limitation, tablets, capsules, powder solutions, suspensions, sustained release formulations and the like.

Suitable dosage units such as dragees (sugar-coated tablets), tablets, suppositories or ampoules, preferably contain 5–50 mg. of an active substance according to the invention or a pharmaceutically acceptable salt thereof.

Dosage units for oral administration preferably contain between 1–90% of a compound of the general formula I or a pharmaceutically acceptable salt thereof as active substance. They are produced by combining the active substance with, e.g., solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols, to form tablets or dragee cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance.

Other dosage units suitable for oral administration are hard gelatine capsules and also soft capsules made of gelatine and a softener such as glycerine. The hard gelatine capsules preferably contain the active substance as a granulate, e.g. in admixture with fillers such as maize starch and/or lubricants such as talcum or magnesium stearate and, optionally, stabilisers such as sodium metabisulphite (Na$_2$S$_2$O$_5$) or ascorbic acid. In soft gelatine capsules, the active substance is preferably dissolved or suspended in suitable liquids such as liquid polyethylene glycols to which stabilisers can also be added.

Examples of dosage units for rectal administration are suppositories which consist of a combination of an active substance or a suitable salt thereof with a fatty foundation, or also gelatine rectal capsules which contain a combination of the active substance or a suitable salt thereof with polyethylene glycols.

Ampoules for parenteral, particularly intramuscular, administration preferably contain a water soluble salt of an active substance in a concentration of, preferably, 0.5–5%, in aqueous solution, optionally together with suitable stabilising agents and buffer substances.

The following prescriptions further illustrate the production of tablets and dragees:

(a) 250 g. of 2 - chloro-11-(4-methyl-1-piperazinyl)-10,11 - dihydro dibenzo[b,f]thiepin - 10 - ol methane sulphonate are mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicium dioxide are mixed in and the mixture is pressed into 10,000 tablets each weighing 100 mg. and containing 25 mg. of active substance. If desired the tablets can be grooved for better adaptation of the dosage.

(b) A granulate is produced from 250 g. of 2-chloro-11-(4-methyl-1-piperazinyl)-10,11-dihydro - dibenzo[b,f] thiepin-10-ol methane sulphonate, 175.90 g. of lactose and the alcoholic solution of 10 g. of stearic acid. After drying, the granulate is mixed with 56.60 g. of colloidal silicium dioxide, 165 g. of talcum, 20 g. of potato starch and 2.50 g. of magnesium stearate and the mixture is pressed into 10,000 dragée cores. These are then coated with a concentrated syrup made of 502.28 g. of crystallised saccharose, 6 g. of shellac, 10 g. of gum arabic, 0.22 g. of dyestuff and 1.5 g. of titanium dioxide and dried. The dragées obtained each weigh 120 mg. and contain 25 mg. of active substance.

The following examples illustrate the production of the new compounds of general Formula I and the preparation of pharmaceutical compositions without limiting the scope of the invention. The temperatures are given in degrees centigrade.

EXAMPLE 1

17.0 g. of 11-(4-methyl-1-piperazinyl)-dibenzo[b,f] thiepin-10(11H)-one are dissolved in 60 ml. of abs. tetrahydrofuran and a suspension of 4.0 g. of lithium aluminium hydride in 50 ml. of abs. tetrahydrofuran are added dropwise to the 10–20° warm solution within 15 minutes. The reaction mixture is refluxed for 6 hours, then cooled to 20° and 7 ml. of water are added dropwise. The precipitate obtained is filtered off and washed with tetrahydrofuran. The filtrate is dried over calcium chloride, evaporated in vacuo and the residue is recrystallised from acetic acid ethyl ester. The pure 11-(4-methyl-1-piperazinyl)-10,11-dihydro-dibenzo[b,f]thiepin-10-ol obtained melts at 153.5–156°.

EXAMPLE 2

(a) 17.9 g. of 2-chloro-11-(4-methyl-1-piperazinyl)-dibenzo[b,f]thiepin-10(11H)-one dissolved in 150 ml. of abs. tetrahydrofuran are added dropwise within 30 minutes at 20–30° to a suspension of 4 g. of lithium aluminium hydride in 80 ml. of abs. tetrahydrofuran. The reaction mixture is refluxed for 5 hours, cooled to 20°, 8 ml. of water are carefully added and the product is worked up analogously to Example 1. The crude product obtained is recrystallised from propanol, whereupon the pure 2-chloro-11-(4-methyl-1-piperazinyl)10,11-dihydro-dibenzo[b,f]thiepin-10-ol melts at 196–201°.

(b) To produce the corresponding 10-ol-propionate compound, 9.6 g. of the 2-chloro-11-(4-methyl-1-piperazinyl)-10,11-dihydro-dibenzo[b,f]thiepin-10-ol obtained according to (a) are dissolved by heating in 100 ml. of abs. pyridine and 5.2 g. of propionic acid anhydride (in 50% excess) are added to the solution obtained. The reaction mixture is left to stand overnight and is then carefully concentrated. The residue is dissolved in cold water, the solution obtained is extracted three times with ether, the combined ether extracts are washed with water, dried with calcium chloride and concentrated on a water bath. The residue is dissolved in 40 ml. of methylethyl ketone and the solution obtained is made acid to congo paper with alcoholic hydrochloric acid whereupon the pure, water soluble dihydrochloride of 2-chloro-11-(4-methyl - 1 - piperazinyl)-10,11-dihydro-dibenzo[b,f]thiepin-10-ol propionate melts at 153–155°.

(c) The free base obtained according to (a) may be converted into the methane sulphonate as follows: 5 g. of the free base are dissolved in 300 ml. of boiling methylethyl ketone, 1.33 g. of methane sulphonic acid are added to the solution obtained while stirring, the mixture is left to stand for 16 hours, the precipitated crystals are removed, washed with methylethyl ketone and dried in vacuo at 60°. A colourless powder is obtained, M.P. 191–192°, which completely dissolves in water. The aqueous solution has a weakly acid reaction.

EXAMPLE 3

8-chloro-11-(4-methyl - 1 - piperazinyl)-10,11-dihydro-dibenzo[b,f]thiepin-10-ol, M.P. 175–177°, is obtained analogously to Example 2 starting from 20 g. of 8-chloro-11-(4-methyl - 1 - piperazinyl)-dibenzo[b,f]thiepin-10 (11H)-one and 4,5 g. of lithium aluminium hydride.

EXAMPLE 4

17.7 g. of 2-methoxy-11-(4-methyl-1-piperazinyl)-dibenzo[b,f]thiepin-10(11H)-one are dissolved while warming in 80 ml. of abs. tetrahydrofuran. This solution is added dropwise at 10–20° to 4 g. of lithium aluminium hydride in 60 ml. of tetrahydrofuran, the reaction vessel being occasionally cooled. The mixture is then refluxed for 3 hours, cooled to 20° and 8 ml. of water are added. The crude product obtained is worked up analogously to Example 1 and recrystallised from acetic acid ethyl ester whereupon pure 2-methoxy-11-(4-methyl-1-piperazinyl)-10,11-dihydro-dibenzo[b,f]thiepin-10-ol is obtained, M.P. 156–160.2°.

The methane sulphonate may be prepared from the free base: 7.6 g. of the free base are dissolved in 300 ml. of methylethyl ketone at 70°, 2.26 g. of methane sulphonic acid are added to the solution while stirring whereupon the crystalline methane sulphonate precipitates. This is filtered off under suction and dried in vacuo at 60°. The methane sulphonate melts at 153–156° and dissolves easily in water. The aqueous solution has a weakly acid reaction.

EXAMPLE 5

2-chloro-11-[4-(2-hydroxyethyl) - 1 - piperazinyl]-10,11-dihydro - dibenzo[b,f]thiepin-10-ol, M.P. 164–168° (from nitromethane) is obtained analogously to Example 1 starting from 2-chloro-11-[4-(2-hydroxyethyl)-1-piperazinyl]-dibenzo[b,f]thiepin - 10(11H) - one, M.P. 157–161°, with lithium aluminium hydride.

EXAMPLE 6

2 g. of 2-methoxy-11-(4-methyl-hexahydro-1H-1,4-diazepin-1-yl)-dibenzo[b,f]thiepin-10(11H)-one are dissolved in 30 ml. of abs. tetrahydrofuran and the solution obtained is added dropwise to a stirred suspension of 1 g. of lithium aluminium hydride in 50 ml. of abs. tetrahydrofuran. The reaction mixture is refluxed for 3 hours at 60–70° and then 2 ml. of water are added dropwise. The precipitate formed is filtered off under suction and washed with tetrahydrofuran. The filtrate is concentrated and the residue is recrystallised from acetonitrile. The pure 2-methoxy-11-(4-methyl - hexahydro-1H-1,4-diazepin-1-yl)-10,11-dihydro-dibenzo[b,f]thiepin-10-ol obtained melts at 134–137°.

EXAMPLE 7

19 g. of 2-methoxy-11-(4-benzyl-1-piperazinyl)-dibenzo[b,f]thiepin-10(11H)-one (M.P. 123–125°) are dissolved in 150 ml. of abs. tetrahydrofuran and this solution is added dropwise within 1 hour to a stirred suspension of 6 g. of lithium aluminium hydride in 40 ml. of abs. tetrahydrofuran. The reaction mixture obtained is heated to 60–70° and left to stand at this temperature overnight. The crude product obtained is worked up analogously to Example 1 and recrystallised from acetonitrile, whereupon the pure 2-methoxy-11-(4-benzyl-1-piperazinyl)-10,11-dihydro-dibenzo[b,f]thiepin-10-ol is obtained. M.P. 99–103°.

EXAMPLE 8

20 g. of 2 - chloro - 11 - (4-benzyl-1-piperazinyl)-dibenzo[b,f]thiepin-10(11H)-one are dissolved in 100 ml. of abs. tetrahydrofuran. The solution obtained is added dropwise to a stirred suspension of 4.5 g. of lithium aluminium hydride in 30 ml. of abs. tetrahydrofuran and the reaction mixture is refluxed for 4 hours. After working up the product as described in Example 1, it is recrystallised from acetonitrile. Pure 2-chloro-11-(4-benzyl-1-piperazinyl)-10,11-dihydro-dibenzo[b,f]thiepin-10-ol is obtained, M.P. 114–117°.

EXAMPLE 9

8-methylthio-11-(4-methyl - 1 - piperazinyl)-10,11-dihydro-dibenzo[b,f]thiepin-10-ol is obtained analogously to Example 1 starting from 8-methylthio-11-(4-methyl-1-piperazinyl)dibenzo[b,f]thiepin-10(11H)-one by reduction with lithium aluminium hydride. After recrystallisation from alcohol, it melts at 174–175°.

EXAMPLE 10

250 g. of 2-chloro-11-(4-methyl-1-piperazinyl)-10,11-dihydro dibenzo[b,f]thiepin-10-ol, 175.8 g. of lactose and 169.7 g. of potato starch are mixed, the mixture is moistened with an alcoholic solution 10 g. of stearic acid and granulated through a sieve. After drying, 160 g. of potato starch, 200 g. of talcum, 2.5 g. of magnesium stearate and 32 g. of colloidal silicon dioxide are mixed thereto and the mixture is pressed into 10,000 tablets each weighing 100 mg. and containing 25 mg. of the active thiepinol. If desired, the tablets can be grooved to enable better adaptation of the dosage instructions.

EXAMPLE 11

250 g. of 8-chloro-11-(4-methyl-1-piperazinyl)-10,11-dihydro dibenzo[b,f]thiepin-10-ol is worked up and pressed into tablets as described in Example 10.

EXAMPLE 12

1.0 g. of 2-chloro-11-(4-methyl-1-piperazinyl)-10,11-dihydro dibenzo[b,f]thiepin-10-ol methane sulfonate and 0.10 g. of ascorbic acid are dissolved in distilled water and the solution is diluted up to 100 ml. The solution obtained is used to fill ampoules each containing, e.g. 1 ml. which corresponds to a content of 10 mg. of the active thiepinol. The filled ampoules are then sterilized by heating in the usual way.

EXAMPLE 13

10 mg. to 200 mg. of 2-chloro-11-(4-methyl-1-piperazinyl)-10,11-dihydro dibenzo[b,f]thiepin-10-ol methane sulfonate are introduced into a two-piece gelatine No. 1 capsule.

What is claimed is:

1. A compound of the formula

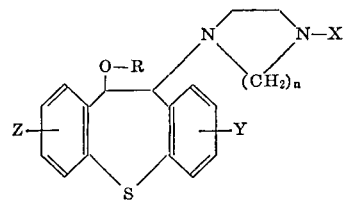

wherein:

R is hydrogen or lower alkanoyl with up to 7 carbon atoms;

X is hydrogen, lower alkyl, lower hydroxyalkyl or benzyl;

Y and Z each independently are hydrogen, fluorine, chlorine, bromine, lower alkyl, lower alkoxy, or lower alkylthio; and $n$ is an integer of 2 or 3;

or a pharmaceutically acceptable acid addition salt thereof.

2. A compound as defined in claim 1 wherein R is hydrogen or lower alkanoyl with up to 7 carbon atoms; $n$ is 2 or 3; X is methyl, 2-hydroxyethyl, or benzyl; and Y and Z each independently are hydrogen, chlorine, lower alkoxy, or lower alkylthio or a pharmaceutically acceptable acid addition salt thereof.

3. A compound as defined in claim 1 wherein said compound is 11 - (4-methyl-1-piperazinyl)-10,11-dihydro-dibenzo[b,f]thiepin-10-ol.

4. A compound as defined in claim 1 wherein said compound is 2-chloro-11-(4-methyl-1-piperazinyl)-10,11-dihydro-dibenzo[b,f]thiepin-10-ol.

5. A compound as defined in claim 1 wherein said compound is 2-chloro-11-(4-methyl-1-piperazinyl)-10,11-dihydro dibenzo[b,f]thiepin-10-ol methane sulfonate.

6. A compound as defined in claim 1 wherein said compound is 2-chloro-11-(4-methyl - 1 - piperazinyl)-10,11-dihydro dibenzo[b,f]thiepin-10-ol propionate.

7. A compound as defined in claim 1 wherein said compound is 8-chloro-11-(4-methyl-1-piperazinyl)-10,11-dihydro dibenzo[b,f]thiepin-10-ol.

8. A compound as defined in claim 1 wherein said compound is 2 - methoxy - 11-(4-methyl-1-piperazinyl)-10,11-dihydro dibenzo[b,f]thiepin-10-ol.

9. A compound as defined in claim 1 wherein said compound is 2-methoxy-11-(4-methyl-1-piperazinyl)-10,11-dihydro dibenzo[b,f]thiepin-10-ol methane sulfonate.

10. A compound as defined in claim 1 wherein said compound is 2 - chloro-11-[4-(2-hydroxyethyl)-1-piperazinyl]-10,11-dihydro dibenzo[b,f]thiepin-10-ol.

11. A compound as defined in claim 1 wherein said compound is 2-methoxy-11-(4-methyl-hexahydro-1H-1,4-diazepin-1-yl)10,11-dihydro dibenzo[b,f]thiepin-10-ol.

12. A compound as defined in claim 1 wherein said compound is 2 - methoxy - 11-(4-benzyl-1-piperazinyl)-10,11-dihydro dibenzo[b,f]thiepin-10-ol.

13. A compound as defined in claim 1 wherein said compound is 2-chloro-11-(4-benzyl-1-piperazinyl)-10,11-dihydro dibenzo[b,f]thiepin-10-ol.

14. A compound as defined in claim 1 wherein said compound is 8 - methylthio-11-(4-methyl-1-piperazinyl)-10,11-dihydro dibenzo[b,f]thiepin-10-ol.

References Cited

UNITED STATES PATENTS

| | | | |
|---|---|---|---|
| 3,356,680 | 12/1967 | Schindler et al. | 260—268 |
| 3,359,271 | 12/1967 | Schlindler et al. | 260—268 |
| 3,391,160 | 7/1968 | Schlindler et al. | 260—327 |

DONALD G. DAUS, Primary Examiner

U.S. Cl. X.R.

260—239; 424—258